Figure 1:
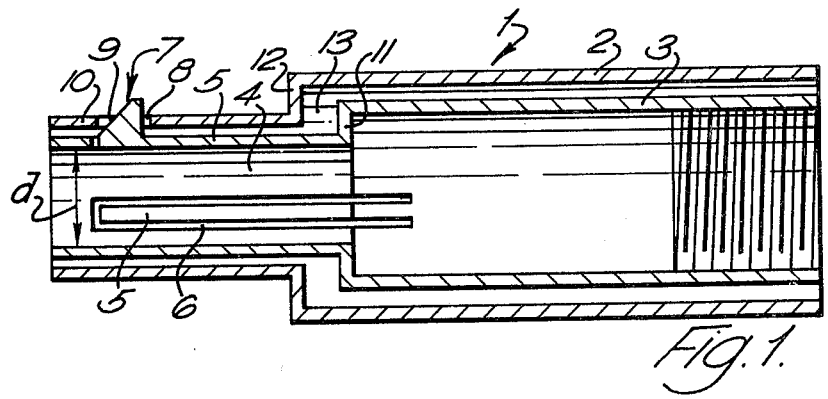

United States Patent
Lee-Kemp

[11] 3,937,547
[45] Feb. 10, 1976

[54] CONNECTOR PORTION HAVING RELEASABLE FASTENING MEANS

[76] Inventor: Kenneth William Lee-Kemp, Ragstones, The Vine, Sevenoaks, Kent, England

[22] Filed: May 3, 1974

[21] Appl. No.: 466,773

[30] Foreign Application Priority Data
May 8, 1973 United Kingdom............... 21928/73
May 10, 1973 United Kingdom............... 53514/72

[52] U.S. Cl................ 339/74 R; 285/315; 285/319; 339/91 R
[51] Int. Cl.²........................................ H01R 13/54
[58] Field of Search................... 285/315, 317, 319; 403/322, 326, 329; 339/91 R, 91 P, 74 R

[56] References Cited
UNITED STATES PATENTS

| | | | |
|---|---|---|---|
| 2,457,523 | 12/1948 | Bird | 285/315 |
| 3,430,184 | 2/1969 | Acord | 339/91 R |
| 3,431,533 | 3/1969 | Mouttet | 339/177 R |
| 3,671,922 | 6/1972 | Zerlin | 339/91 R |
| 3,672,708 | 6/1972 | Zemberry | 285/315 |

FOREIGN PATENTS OR APPLICATIONS

| | | | |
|---|---|---|---|
| 87,691 | 9/1966 | France | 285/315 |

*Primary Examiner*—Roy Lake
*Assistant Examiner*—Mark S. Bicks
*Attorney, Agent, or Firm*—Baldwin, Wight & Brown

[57] ABSTRACT

A plug and socket connector is disclosed having releasable locking means to prevent unintentional disconnection. The locking means comprises spring catches preferably formed from flat resilient material and they are fitted in a recess or respective recesses in a shell which forms part of one of the connector portions. An environmental seal is provided by locating the catches in the recess or recesses. Other catches are disclosed which are formed in a solid tubular member.

6 Claims, 19 Drawing Figures

CONNECTOR PORTION HAVING RELEASABLE FASTENING MEANS

This invention relates to a connector having male and female portions securable by releasable fastening means. The connector can be used, for example, for joining tubes or for joining pins and sockets in an electrical connector.

Precision electrical connectors are known having a slidable sleeve or push button which is actuable to release a catch to disengage the plug and socket portions. These connectors are made from many precision parts, some of which require many accurate machining operations. Therefore, the manufacturing costs of such connectors are high. The principle object of the present invention is to reduce the manufacturing cost of such a connector without foregoing the precision of construction necessary for reliable operation.

A further problem arising in such electrical connectors is that of providing a satisfactory seal between the engaged plug and socket portions. It is always desirable to prevent the ingress of foreign matter but it is also often desirable to prevent the ingress of gases or perhaps even liquids. A further object of the invention is to provide a connector, having releasable fastening means, which is environmentally sealed when its plug and socket portions are joined.

It will be understood that the diameters of cylindrical connector portions are often standardized, for example, according to the DIN system. A disadvantage of some known connectors having releasable fastening means is that a large proportion of the space within the connector is used to accommodate a catch and an inner shell for providing an environmental seal. Thus, as the space within the connector body is reduced for accommodating pins or sockets, the overall size of the connector, particularly the diameter of the cylindrical portion, may need to be increased to accommodate the same number of pins. Preferred embodiments of the invention seek to reduce this disadvantage by providing a construction and method of assembling a connector which helps to conserve the overall size of the connector particularly when an environmental seal is required.

The invention achieves its principal object by providing a male connector portion comprising concentric outer and inner shells and at least one detent or spring catch preferably formed from a flat sheet of resilient material., the inner shell having a recess in its outer surface in which said detent or spring catch is fitted and the outer shell having an opening therein through which a flexible portion of said detent or spring catch extends, said flexible portion being deflected for disengaging said male portion from a corresponding female portion by sliding the outer shell relative to the inner shell.

As the detent or spring catch is not part of the inner shell it can be formed more easily manufactured independently under optimum conditions. When made from flat resilient material such as beryllium copper which is worked for example, by stamping, manufacturing costs are much further reduced because many machining operations are avoided. Moreover the spring catch can be replaced, at low cost, in order to repair or service the connector. The preferred flat resilient material is beryllium copper because it retains its resiliency over a long period. It would not be used when the spring catch or catches are machined from solid material because of the expense and machining problems. In the latter case, brass is often used but this material loses its resiliency with continued use.

Preferably, said detent or spring catch is in the form of a strip which is bent to give the general outline of an elongated portion coextensive with two sides of a triangle. Such a strip is freely supported at its ends above the recess in the inner shell.

An environmental seal is provided in a connector having a male portion in accordance with the invention because the inner shell is not pierced by any machining operations. A resilient seal can be provided between the nose of the male portion and a corresponding abutment in the female portion to improve the seal; such a connector can be made gas tight.

preferably, the maximum clearance beneath said flexible portion of the detent or spring catch, between it and the floor of the recess, is substantially equal to the extension of said deflectable portion above the outer surface of the outer shell. In some embodiments where a plurality of detents or spring catches are formed in an integral sleeve, the sleeve is first fitted in the outer shell and the inner shell is then inserted into this sub-assembly.

It is preferred to fit two or three detents or spring catches in the male portion which are equidistantly spaced about the circumference of the inner shell. According to one embodiment of the invention, this can be simply achieved by pressing a continuous element from the flat resilient material, which element is formed into two or three spring catches in the form of a circular band with arms projecting therefrom.

Figure 2:
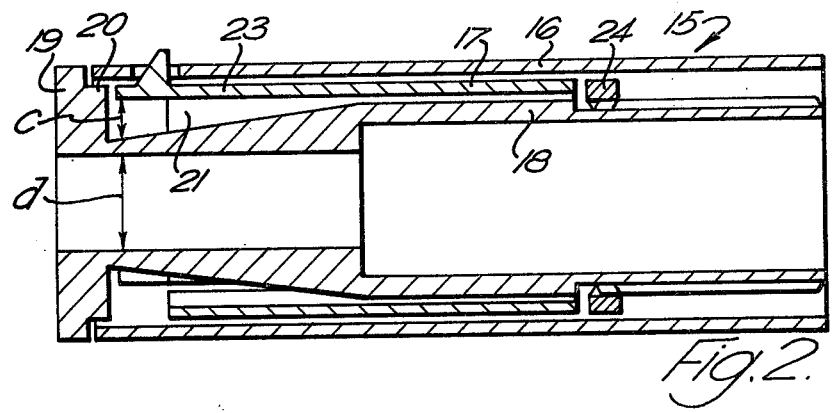
Figure 3:
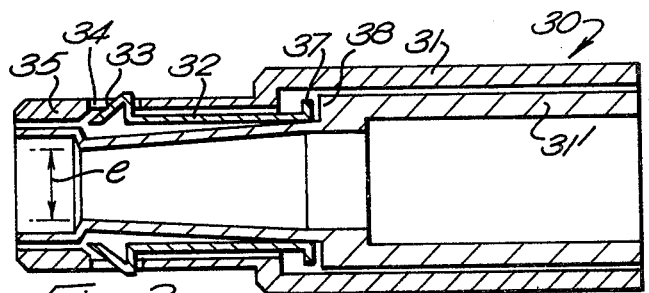
Figure 4:
Figure 5A:
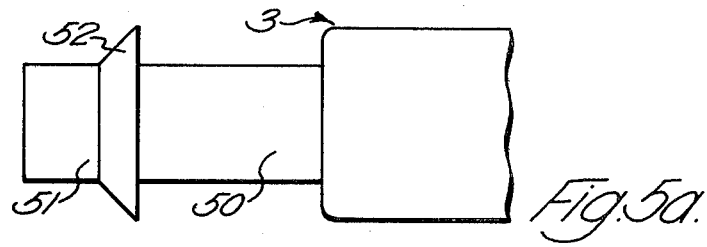
Figure 5B:
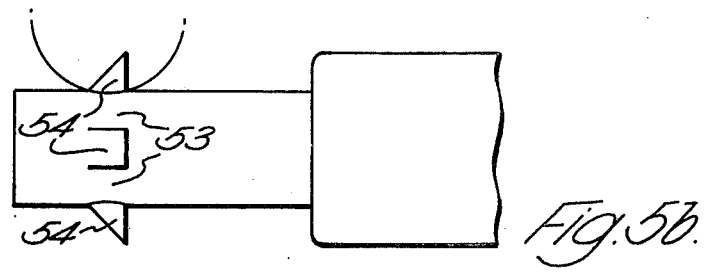
Figure 5C:
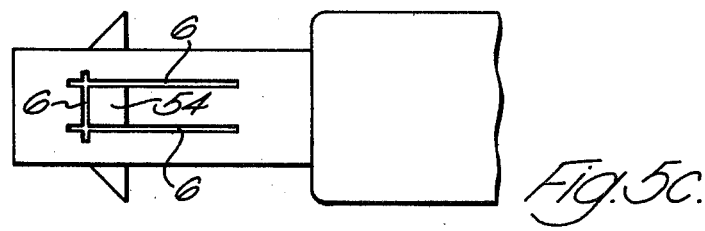
Figure 5D:
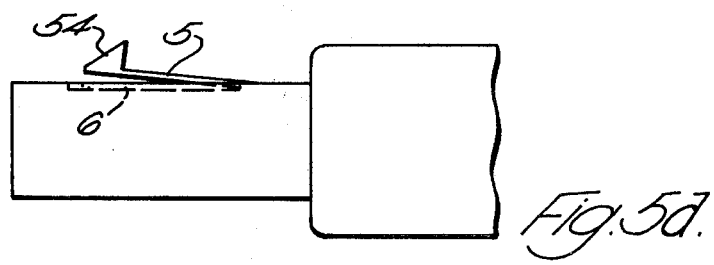
Figure 7:
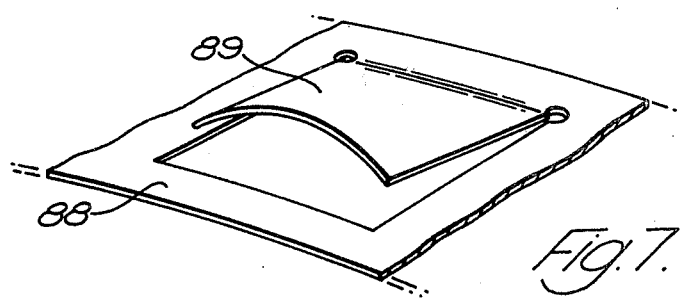
Figures 6, 13:
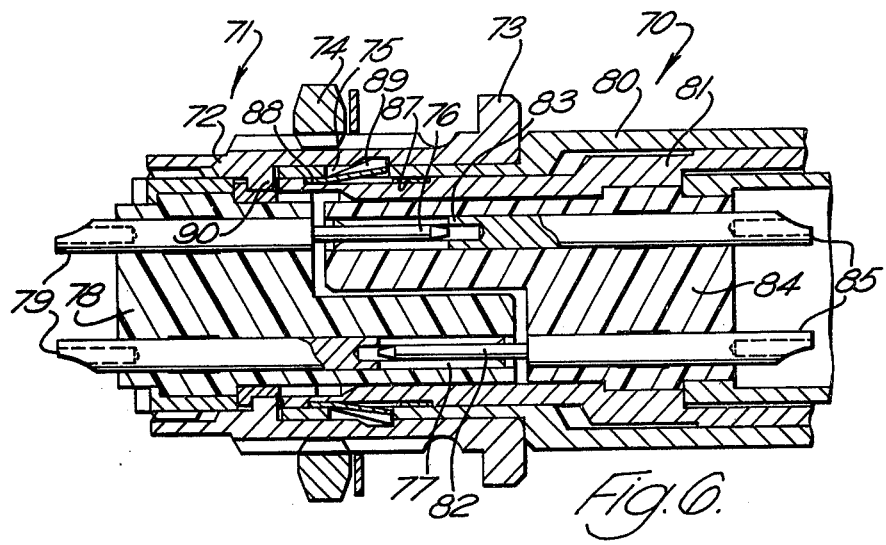
Figure 14:
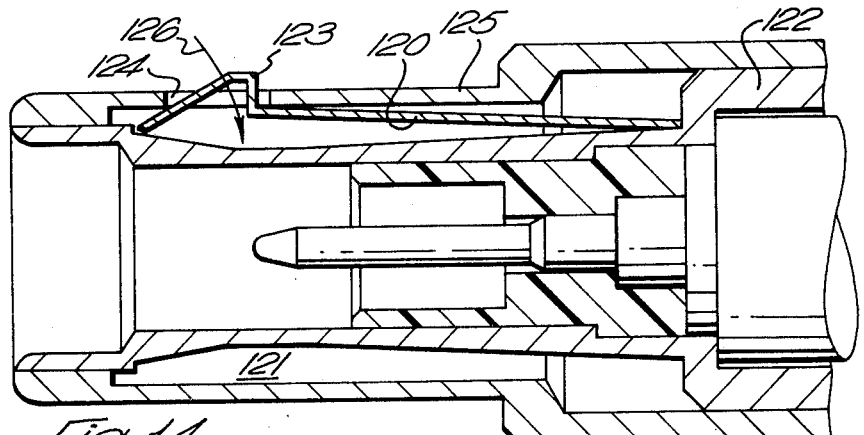
Figure 15:
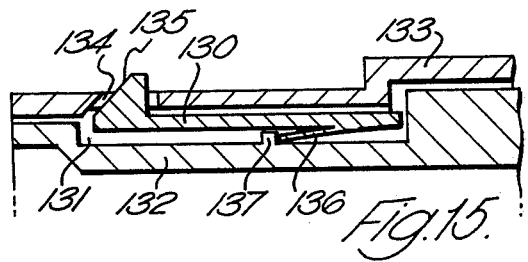
Figure 16:
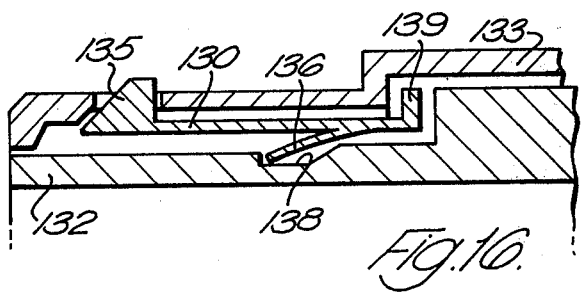

Embodiments of the invention will now be described with reference to some of the accompanying drawings, in which:

FIG. 1 shows a schematic longitudinal section through a plug portion of a known connector, FIG. 2 shows a schematic longitudinal section through a plug portion of another known connector incorporating an internal shell to provide an environmental seal, FIG. 3 shows a schematic longitudinal section through a plug portion of an embodiment according to the invention, FIG. 4 is an enlarged view of part of the plug portion shown in FIG. 3, FIGS. 5A – 5D schematically illustrate the stages in the production of a connector portion as shown in FIG. 1, FIG. 6 is a longitudinal section through part of a connector according to the invention, FIG. 7 is a perspective view of a detent or spring catch for use in the embodiment of FIG. 6, FIGS. 8–13 respectively illustrate further embodiments, detents or spring catches of the present invention, FIG. 14 is a longitudinal sectional view of another embodiment of the invention, and FIGS. 15 and 16 are schematic, part sectional views of further embodiments of the invention which are modifications of the connector portion shown in FIG. 3.

Referring to FIG. 1, the known plug portion 1 generally comprises an outer shell 2 coaxial with an inner shell 3. Portion 4 of the inner shell 3 is machined, as described below, to define integral resilient arms 5 each bounded by saw cuts or slits 6. An end or catch portion 7 of each arm 5 extends through a corresponding aperture 8 in shell 2. Each catch portion 7 has an inclined face 9 for abutting the edge of a portion 10 of shell 2. Shoulders 11 and 12 are spaced by a gap which permits axial movement of shell 2 relative to shell 3 whereby catch portion 7 is depressed (by shell portion 10) towards the axis of the inner shell 3. Catch portions 7 engage an annular recess in a socket portion (not shown) of the completed connector.

Referring to FIGS. 5A – 5C, inner shell 3 is produced by machining tubular portions 50, 51 so as to define a flange 52. As shown in FIG. 5B, portions of flange 52 are machined away to leave gaps 53. Four wedge-shaped protuberances 54 remain after this machining operation. FIG. 5C shows how axial and transverse saw cuts 6 are then made adjacent each protuberance 54. Finally, FIG. 5D shows how each protuberance 54 (or the end portion 7 of FIG. 1 which is part of the arm 5) is deformed upwardly so as to provide an outward bias for urging the protuberance through the aperture 8 in the outer shell 2.

It will be appreciated that the manufacturing costs of the connector portion described above is increased by the multiplicity of machining operations and the need to deburr the metal and to remove sharp edges. Moreover, cuts or slits 6 allow ingress of gases or foreign matter to the interior of inner shell 3.

The catches of plug portion 15 shown in FIG. 2 are similarly made but, in this case, an environmental seal is provided. An outer shell 16 is coaxial with an inner shell 17 and a tubular sleeve 18. Sleeve 18 provides an environmental seal and has a flange 19 with a shoulder 20 for locating the leading end of shell 16. A recess 21 of triangular section is deep enough to accommodate the thickness of a catch portion 22 of a resilient arm 23. This is because the inner shell 17 is fitted to the sleeve 18 before this sub-assembly is inserted in the outer shell 16.

Comparing the cross-sections of connector portions 1 and 15, it will be seen that the internal diameter $d$ of each is the same. Diameter $d$ is maintained in connector portion 15 only at the expense of incresing the diameter of the inner shell and outer shell to allow for the depth $c$. Both the provision of sleeve 18 and the increased size of the inner and outer shells increase the manufacturing costs.

Embodiments of the invention will now be described.

The male connector portion shown in FIG. 3 comprises an outer shell 31 coaxial with an inner shell 31'. At least one detent or spring catch 32 is formed as a tubular member either by machining a solid stock or by forming flat sheet material. An inclined face 33 of each spring catch 32 projects through an aperture 34 and is abutted by a rim 35 of the outer shell 31 when the outer shell is moved axially to the right of the drawing. The end of each catch 32 is received in a respective recess 36 better seen in the enlarged view of FIG. 4. An outturned flange 37 abuts a shoulder 38 to prevent rearward movement of the catches 32 and a tang or tooth (not shown), located between each catch 32 and extending from the flange end of the tubular member towards the leading end of the connector, is located in a respective recess or groove to prevent rotation of the tubular member. Alternatively, the forward or downturned edge of the spring catch 32 is extended to abut and be located in a recess or groove in the inner shell; such an arrangement again providing more positive locating and preventing rotation of the tubular member.

Referring to FIG. 4, the extension $f$ of the catch portion 33 above the outer shell 31 is substantially the same as the maximum clearance $f$ between the underside of the catch 32 and the deepest part of the recess 36. The components shown in FIG. 3 are assembled by first fitting tubular member having catches 32 within the outer shell 31 so that the catches extend through apertures 34 and then fitting the inner shell 31' within the outer shell 31. A comparison of the cross-sectional views on the lefthand side of FIGS. 1, 2 and 3 will illustrate the differences in the shell diameters. For example, diameter $e$ of connector portion 30 is only slightly less than the internal diameter $d$ of conductor portion 15 whereas the external diameters of portions 30 and 15 are vastly different.

FIG. 6 shows an assembled connector in accordance with the invention. The connector comprises a male portion 70 and a female portion 71.

The female portion 71 comprises an annular sleeve 72 having a flange 73 which can be abutted by a locking nut 74, threadably engaging sleeve 72, to provide for panel-mounting. Sleeve 72 houses a plurality of pin and socket members 76 and 77 located in a plug of insulating material 78. The pin and socket members 76, 77 are connected to pins 79 provided with sockets to receive soldered conductors.

The male portion 70 comprises an outer shell 80 and an inner shell 81. The inner shell houses a corresponding plurality of pin and socket members 82, 83 in an insulating plug 84. Pin and socket members 82, 83 are connected to pins 85 which have sockets to receive soldered conductors. Means (not shown) may be included in the male portion 70 for clamping a cable of which individual conductors are soldered to pins 85.

Inner shell 81 includes either a plurality of recesses or an annular recess 87. Recesses or recess 87 locate a plurality of releaseable spring catches. The catches are separate when a plurality of individual recesses 87 are provided and are formed integrally, in a band, when an annular recess 87 is provided.

As shown in FIG. 7, spring catches are formed from flat resilient material and have a body portion from which an uplifted portion or detent 89. The material is preferably beryllium copper sheet and the spring catches may be formed by stamping. The whole detent 89 is formed arcuately with a smaller radius of curvature than the body portion to strengthen it against axial stress caused when one of its edges engages a corresponding wall of recess 73 during actuation to release the catch.

The uplifted portion or detent 89 extends through a corresponding opening 75 in the leading end of outer shell 80. Each uplifted portion 89 is biased by its own resislience, i.e., it is prestressed, to extend through the respective opening 75. Outer shell 80 is axially slidable on inner shell 81 and, when outer shell is displaced to the right of the drawing, the uplifted portions 89 are depressed and are disengaged from an annular recess 87 in the female portion 71. The male and female portions 70, 71 can thus be separated. On the other hand, if an axial force is exerted on the inner shell 81, for example, by tugging on a cable joined to pins 85, separation of the portions 70, 71 is prevented by the engagement between each uplifted portion 89 and the annular recess 87.

It will be noted that the inner shell is not pierced by machine cuts and therefore it acts as an improved environmental seal. By providing a resilient seal between the nose of inner shell 81 and a corresponding inner flange 90 within female portion 71, the connector can be made gas-tight.

In view of its arcuate form, the uplifted portion 89 can exert a strong resistance against the outer shell when moved to disengage the connector portion.

Figure 8:
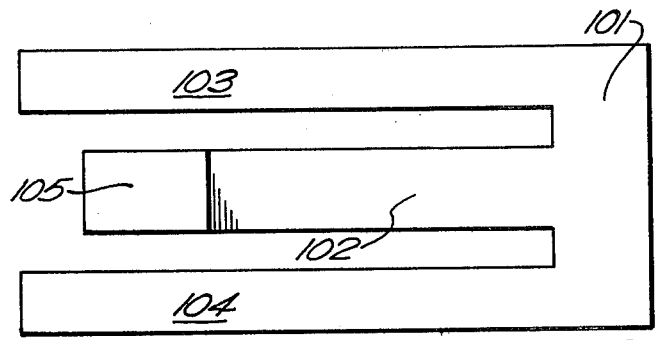
Figure 9:
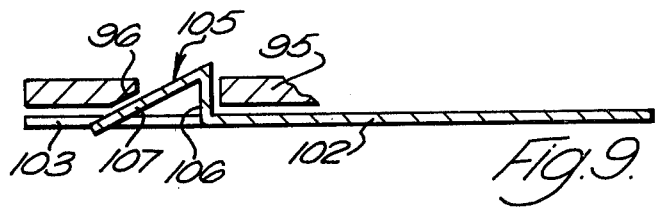

FIG. 8 shows a detent or spring catch 101 which is an improvement in the latter respect. Detent 101 is made from a flat sheet of resilient material and has a substantially E-shape as shown. A resilient tongue 102 is attached to, and bounded on each of two sides, by resilient arms 103, 104. The free ends of arms 103, 104 straddle a recess or hollow in the inner shell of, for example, the male connector portion and the catch part 105 of the detent extends through an opening in the outer shell 95 as shown in FIG. 9. The catch part 105 has a sloping portion 107 and a downturned portion 106 forming two sides of a triangle. Preferably, a lower edge 96 partly defining the aperture in the outer shell 95 for smoothly engaging the sloping portion 107 of the catch 105. When the catch 105 is deflected downwardly, deflection is resisted by resilience of the tongue 102 and to some extent by elastic deformation or bowing of arms 103, 104.

Figure 10:
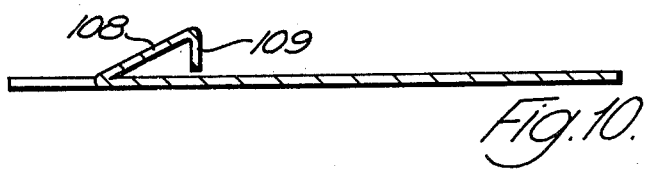

A plurality of detents 101 can be formed separately or integrally in a band. When formed separately, they may be fitted in an annular recess together with circumferential spacers. The detents 101 are either curved when fitted to such an annular recess or are formed of a curved shape as shown in FIG. 10. This curvature is responsible for the bowing of arms 103, 104 when the catch part 105 is deflected.

FIG. 10 shows a differently configured catch which is bent back to form sloping portion 108 and a downturned portion 109.

Figure 11:
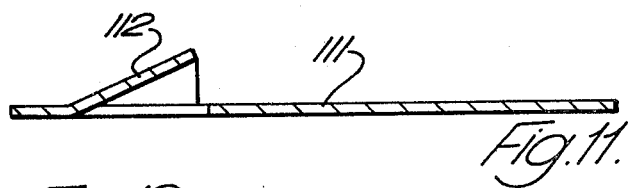
Figure 12:
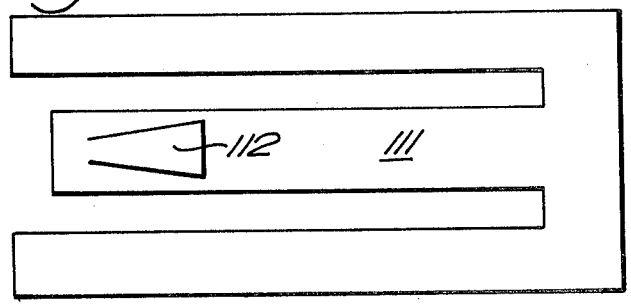

In the embodiment shown in FIGS. 11 and 12, a wedge-shaped protuberance 112 is lifted up from a tongue 111.

FIG. 13 shows how a plurality of detents are integrally formed before being configured into an annular band.

FIG. 14 shows a preferred embodiment in which a pllurality of separate detents 120, which may be formed from resilient strip material, are located in an annular recess in an inner shell 122. In section, the annular recess 121 has a shallow triangular shape and the ends support the free ends of detents 120. A catch part 123 of each detent 120 extends through a respective opening 124 in a leading end of an outer shell 125. When outer shell 125 is moved axially to the left of the drawing, the catch part 123 is deflected downwardly as shown by arrow 126 in order to disengage the illustrated male connector portion from a complementary female portion. The female portion (not shown) preferably includes an annular recess which is engaged by the catch parts 123 of the male portion when the portions are joined.

FIGS. 15 and 16 illustrate respective embodiments which are modifications of the device shown in FIG. 3. Only one half of the relevant part of the connector portion is illustrated in FIGS. 16 and 17 in order to simplify the drawings.

Referring to FIG. 15, a resilient arm 130 (bounded by slits or cut out portions) is located in a recess 131 in an inner shell 132. An outer shell 133 surrounds the inner shell and includes an aperture 134 through which a catch part 135 of the arm 130 extends. The tubular member including arms 130 includes a downturned tooth 136 which engages an upstanding ridge 137 more positively to secure the tubular member during operation.

A similar embodiment is shown in FIG. 16, the same reference numerals identifying the same parts. In this case, ridge 137 is replaced by a recess 138 and the rear end of the tubular member 139 is turned outwardly to define a flange.

I claim:

1. In a quick-release connector having interengageable male and female connector portions, said male connector portion including an outer shell having openings therethrough, an inner shell concentric with said outer shell and having external recesses therein, and a plurality of spring catches, each of said catches having a portion projecting through a respective one of said openings in said outer shell for locking engagement with said female portion, and said outer shell being axially slidable relative to said inner shell to deflect said portions of said catches to cause disengagement from said female connector portion, the improvement comprising the provision of a plurality of separately formed spring catches which are independent of each other and of said inner shell, each of said spring catches being located in a recess in said inner shell, each of said catches being in the form of a flat strip of resilient material, and each strip being freely supported at its ends in said recess in said inner shell whereby, when said portion of each catch is deflected, said strip thereof is deformed by bowing between said freely supported ends.

2. The improvement according to claim 1 wherein each strip is configured to have the general outline of an elongated portion coextensive with said portion which projects through the respective opening in said outer shell, said elongated portion being configured to resist deformation.

3. The improvement according to claim 2 wherein each of said portions of said strips which project through said respective openings are configured to have in elevation the general outline of two sides of a triangle, one side of said triangle extending substantially perpendicular to the longitudinal axis of said outer shell so as to provide positive abutment with an edge of said outer shell defining a respective one of said openings therein, which edge partly defines said opening.

4. A male connector portion for a quick release connector of the type having interengageable male and female connector portions, said male connector portion comprising an outer shell having openings therethrough, an inner shell concentric with said outer shell and having a locating recess in the outer surface thereof, and a plurality of spring catches, said catches each being formed as a flat sheet of resilient material, each catch being defined by an uplifted detent portion bounded at least at opposite sides thereof by axially extending base portions, each detent portions projecting through a respective one of said openings for locking engagement with a female portion, and said outer shell being axially slidable relative to said inner shell for deflecting said detent portions of said catches inwardly to cause disengagement of said detent portions from a female connector portion, said base portion of each of said spring catches being transversely arcuately configured to accommodate the curvature of said locating recess in said inner shell, said detent portions also being transversely arcuately configured with a smaller radius of curvature than that of said base portions whereby said detent portions resist said deflection.

5. A male connector portion according to claim 4 wherein said detent portions are in the form of tongues projecting from a substantially rectangular opening in said base portion, each tongue having a root, and a region on each side of the root of each of said tongues adjacent corresponding corners of said rectangular opening being apertured.

6. A male connector portion according to claim 5 wherein each of said spring catches is formed independently of one another and of said inner shell, and said locating recess is in the form of a plurality of recesses in said inner shell, each receiving one of said spring catches.

* * * * *